United States Patent
Lee et al.

[11] Patent Number: 6,052,394
[45] Date of Patent: Apr. 18, 2000

[54] HIGH POWER PUMPING DEVICE FOR OPTICAL FIBER AMPLIFICATION

[75] Inventors: Yong-Woo Lee, Seoul; Lars Johan Albinsson Nilsson, Suwon, both of Rep. of Korea

[73] Assignee: SamSung Electronics Co., Ltd., Kyungki-do, Rep. of Korea

[21] Appl. No.: 09/153,146

[22] Filed: Sep. 14, 1998

[30] Foreign Application Priority Data

Sep. 12, 1997 [KR] Rep. of Korea ............... 97-47215
Sep. 12, 1997 [KR] Rep. of Korea ............... 97-47216

[51] Int. Cl.[7] ...................................... H01S 3/30
[52] U.S. Cl. .......................... 372/6; 372/69; 372/102
[58] Field of Search ............................ 372/6, 69, 102

[56] References Cited

U.S. PATENT DOCUMENTS 5,526,155  6/1996  Knox et al. .
5,701,318  12/1997  Digonnet et al. ............... 372/6

FOREIGN PATENT DOCUMENTS 62-229105  10/1987  Japan .
62-229891  10/1987  Japan .
4-230085   8/1992   Japan .
5-107420   4/1993   Japan .
5-198893   8/1993   Japan .
6-204593   7/1994   Japan .
6-252475   9/1994   Japan .
9-97940    4/1997   Japan .

Primary Examiner—Leon Scott, Jr.
Attorney, Agent, or Firm—Robert E. Bushnell, Esq.

[57] ABSTRACT

A high power pumping apparatus for optical fiber amplification includes: a pumping portion for generating pumping light of a predetermined wavelength band, the wavelength of which is determined by the wavelength of the pumping light fed back from a subsegment portion; a wavelength division multiplexer for multiplexing the pumping light generated by the pumping portion, for dividing the signal light incident from a subsegment portion according to wavelengths, and for outputting the signal light to the pumping portion; and a broad-band reflecting portion for reflecting some of the output light multiplexed by the wavelength division multiplexer, for outputting the reflected light to the wavelength division multiplexer, and for outputting the remaining light as pumping light for light amplification. In the high power pumping apparatus according to the present invention, the same pumping diodes can be used without a wavelength selecting diode. The high power pumping is useful for optical fiber amplification for a cable TV and for remote pumping since the pumping is performed therein in a wide spectrum range.

24 Claims, 5 Drawing Sheets

HIGH POWER PUMPING DEVICE FOR OPTICAL FIBER AMPLIFICATION

CLAIM OF PRIORITY

This application makes reference to, incorporates the same herein, and claims all benefits accruing under 35 U.S.C. § 119 from two applications both of which are entitled HIGH POWER PUMPING DEVICE FOR OPTICAL FIBER AMPLIFICATION, and both were earlier filed in the Korean Industrial Property Office on the 12th of Sep. 1997 and there duly assigned Ser. Nos. 47215/1997 and 47216/1997.

BACKGROUND OF THE INVENTION

1. Technical Field

The present invention relates to a pumping device and, more particularly, to a high power pumping apparatus using a wavelength multiplexed pumping source for optical fiber amplification.

2. Related Art

An optical fiber amplifier is variously used in an optical transmission system, such as a wavelength division multiplexing system.

In general, the output power of an optical fiber amplifier is restricted by the pumping power. In particular, in a single mode optical fiber amplifier in which pumping is performed, the pumping power restricts the output power of the optical fiber amplifier to several hundred milliwatts (mW). Therefore, a multimode exciting diode may be used, together with a cladding exciting optical fiber or a beamshaper, in order to obtain high power. However, the intensity (brightness) of the output light by use of the multimode exciting diode is much smaller than the intensity of optical light by use of a single mode exciting diode. Such a small light intensity may make it difficult to operate the optical fiber amplifier in high population inversion. High population inversion is necessary for a gain-flattening optical fiber amplifier, an Erbium doped fiber amplifier (EDFA), and a three-level system such as $Yb^{3+}$ doped optical fiber laser emitted at a wavelength of 980 nm.

Another method of using the high power diode pumping is to use many diodes.

However, this method employs a polarization multiplexer, and that device is quite expensive and is difficult control with respect to its power.

Still another method for optical fiber amplification involves the use of a multi-point injection method. However, this method has problems in that splice loss is generated and the absorption length of the pumping light is reduced. As a result, a lower population inversion, a low gain and a high noise figure are experienced.

Therefore, there is a need for the development of a high power pumping device by means of which it is possible to increase the power of pumping light by increasing the bandwidth of the pumping light. Moreover, there is a need for the development of a high power pumping device which generates stable pumping light by selecting the wavelength of the pumping light using a predetermined reflector.

SUMMARY OF THE INVENTION

It is an object of the present invention to provide a high power pumping device by which it is possible to increase the power of pumping light by increasing the bandwidth of the pumping light and to generate stable pumping light by selecting the wavelength of the pumping light, using a predetermined reflector.

In order to achieve the above object, there is provided a high power pumping apparatus for optical fiber amplification, comprising: a pumping portion for generating the pumping light of a predetermined wavelength band, the wavelength of which is determined by the wavelength of the pumping light fed back from a subsegment portion; a wavelength division multiplexer for multiplexing the pumping light generated by the pumping portion, for dividing the signal light incident from a subsegment portion according to wavelength, and for outputting the signal light to the pumping portion; and a broad-band reflecting portion for reflecting some of the output light multiplexed by the wavelength division multiplexer, for outputting the reflected light to the wavelength division multiplexer, and for outputting the remaining light as pumping light for the light amplification.

A high power pumping apparatus for optical fiber amplification according to the present invention comprises: a pumping portion for generating pumping light of a predetermined wavelength band, the wavelength of which is determined by the wavelength of the pumping light fed back from a subsegment portion; a diffraction grating for diffracting the pumping light generated by the pumping portion with respect to the respective wavelengths, for inversely diffracting the light incident from a subsegment portion, and for outputting the light to the pumping portion; a light collecting lens for collecting the light diffracted by the diffraction grating, for dividing the incident light reflected from a subsegment portion according to the wavelengths, and for outputting the light to the diffraction grating; and an optical fiber grating reflector for reflecting some of the light collected by the light collecting lens, for outputting the reflected light to the light collecting lens, and for outputting the remaining light as pumping light for the light amplification.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

The present invention will be described in detail with reference to the attached drawings.

Figure 1:
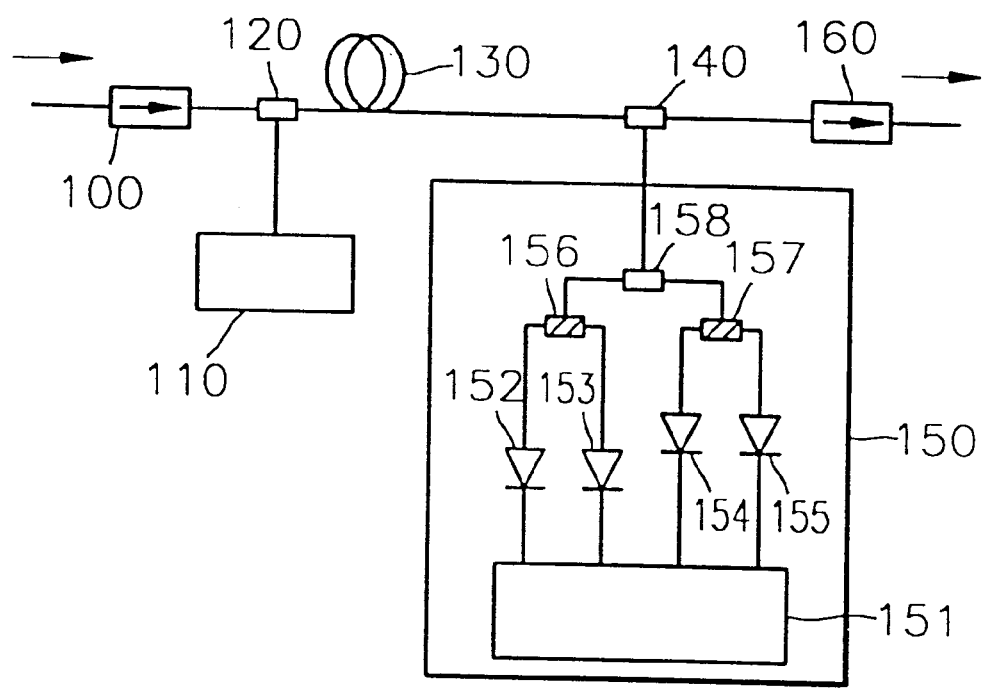
FIG. 1 shows an optical fiber amplifier using a plurality of diodes.

FIG. 1 shows an optical fiber amplifier using a plurality of diodes. The amplifier according to FIG. 1 is comprised of a first isolator 100, a first laser diode (LD) unit 110, a first wavelength division multiplexing combiner 120, an EDF 130, a second wavelength division multiplexing combiner 140, a second LD unit 150, and a second isolator 160.

The first LD unit 110 and second LD unit 150 each comprise a control unit 151, first, second, third, and fourth LDs 152–155, respectively, a first polarization beam combiner 156 for polarization-combining light beams of the same wavelength pumped by first LD 152 and second LD 153, a second polarization beam combiner 157 for polarization-combining lights of the same wavelength pumped by the third LD 154 and fourth LD 155, and a third wavelength division multiplexing combiner 158 for combining light of different wavelengths output from the first and second polarization beam combiners 156 and 157, respectively.

The respective LDs 152, 153, 154 and 155 generate light of a predetermined wavelength according to the control signal FROM control unit 151. The first polarization beam combiner 156 combines light BEAMS of a predetermined wavelength, (for example, 1465 nm), pumped by the first LD 152 and second LD 153. The second polarization beam combiner 157 combines light beams of a predetermined wavelength, (for example, 1490 nm), pumped by the third LD 154 fourth LD 155. The third wavelength division multiplexing combiner 158 multiplexes the output light beams of the first and second polarization beam combiners 156 and 157, respectively.

The first LD unit 110 performs the same operation as the second LD unit 150. The light pumped by the first LD unit 110 is combined with signal light passed through the first isolator 100 and through the first wavelength division multiplexing combiner 120. The EDF 130 amplifies the signal light according to the pumping light passed through the first and second wavelength division multiplexing combiners 120 and 140, respectively. The first isolator 100 and second isolator 160 prevent spontaneous emission generated by the EDF 130 from being reflected from input and output ports and being re-incident. However, the polarization multiplexer used in this method is expensive and it is difficult to control power therein.

Figure 2:
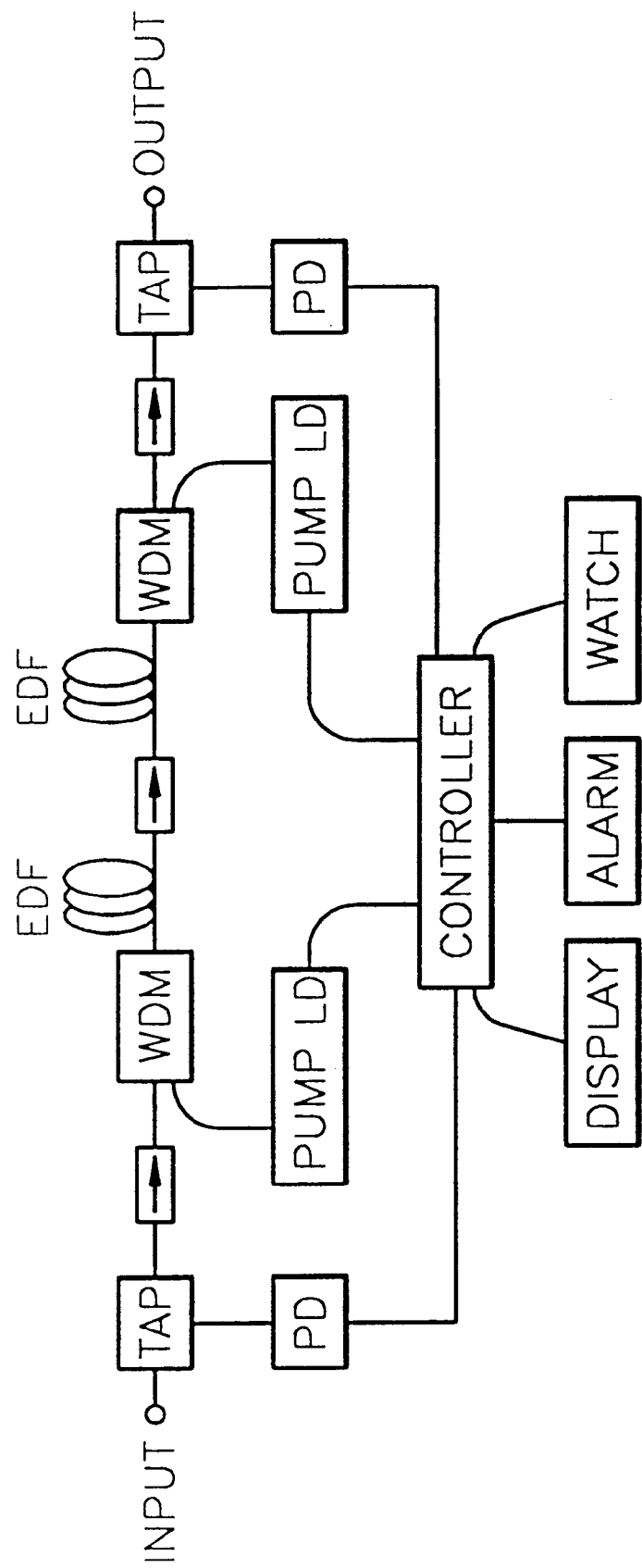
FIG. 2 shows a multi-point optical fiber amplifier.

Still another method for optical fiber amplification is a multi-point injection method. The simplest example of multi-point injection is the bidirectional pumping of the EDFA shown in FIG. 2. It is possible to inject pumping light in an arbitrary position. The element WDM of FIG. 2 is a wavelength division multiplexer. The element PD is a photodiode. However, the multi-point method has problems in that splice loss is generated and the absorption length of the pumping light is reduced. As a result, a lower population inversion, a low gain, and a high noise-figure are caused.

Figure 3A:
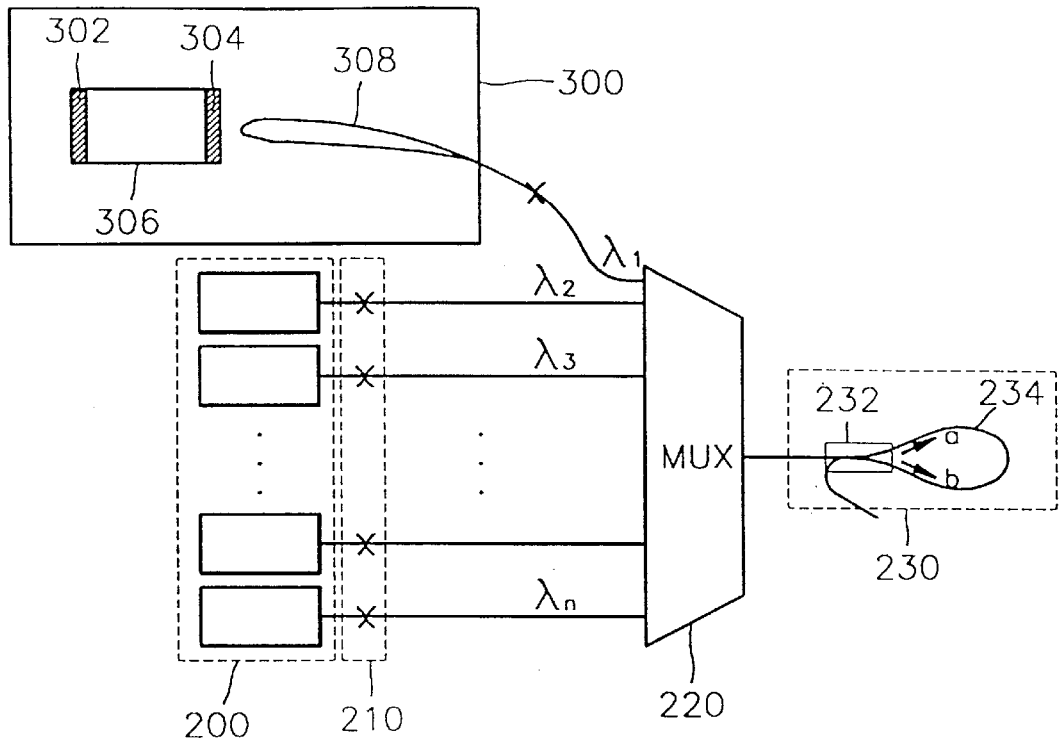
FIG. 3A shows a high power pumping apparatus for optical fiber amplification according to the present invention.
Figure 3B:
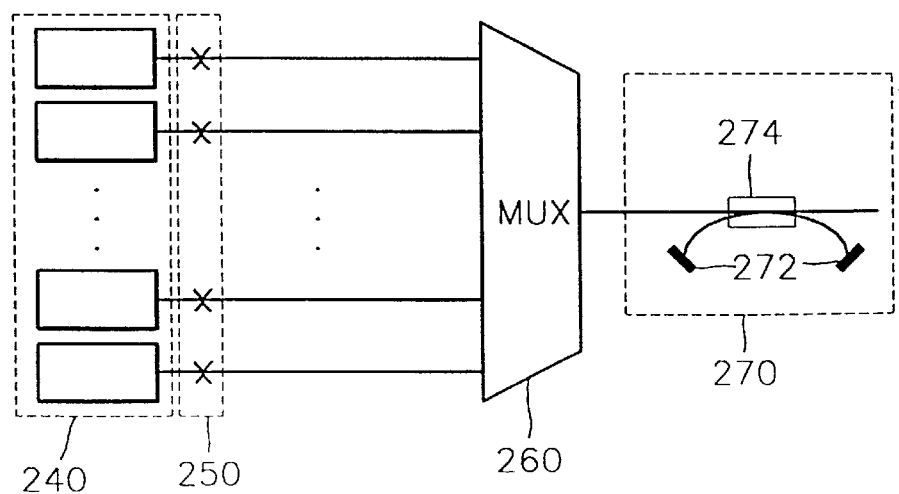
FIG. 3B is a slightly modified embodiment of the apparatus shown in FIG. 3A.
Figure 3C:
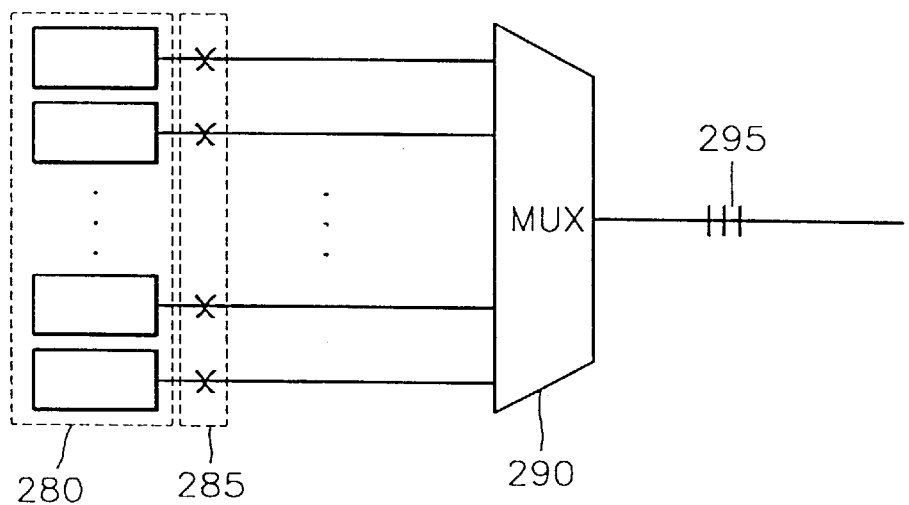
FIG. 3C is another modified embodiment of the apparatus shown in FIG. 3A.

FIGS. 3A through 3C show the structure of a high power pumping device for an optical fiber amplification according to the present invention. The high power pumping device according to FIGS. 3A through 3C comprises a pumping portion 200, a multiplexer (MUX) 220, and a splicing portion 210 for splicing one side of the pumping portion 200 to one side of the MUX 220.

The pumping portion 200 comprises a plurality of pumping means, (for example, a laser diode portion 300) for generating pumping light having the wavelength determined by the light reflected from a broad-band reflecting portion 230 and demultiplexed through the MUX 220. The laser diode portion 300 comprises a laser diode 306 having a surface 302 which is high-reflection (HR) coated and another surface 304 which is anti-reflection (AR) coated, and an optical fiber 308 having one end which contacts the laser diode 306, and is processed to be a lens type, a fine lens being added to the vertical section thereof.

Referring to FIG. 3A, the wide band reflecting portion 230 is comprised of a 90:10 optical coupler 232 connected to the MUX 220, and a polarization maintaining optical fiber loop 234 connected to the optical coupler 232. The polarization maintaining optical fiber loop 234 maintains the polarization of a transmitting mode and transfers the mode.

Since the pumping light generated by the pumping portion 200 is stabilized by external feedback, the respective diodes may have the same wavelength band. External feedback is performed by broad-band reflection of the broad-band reflecting portion 230 and demultiplexing of the MUX 220. The wavelengths of the respective diodes of the pumping portion 200 are selected by the reflecting light incident from the MUX 220. Namely, the respective diodes generate a pumping light having a wavelength determined by the feedback provided by the MUX 220. The generated pumping light is transferred to the respective single mode optical fibers connected to the MUX 220. For example, a diode for pumping light having a wavelength of 980 mn generates a pumping light having a wavelength of 1 $\mu$m or more, when a wavelength of 1 $\mu$m or more is fed back. Therefore, the feedback of a wavelength greater than 990 nm is suppressed. Since the output surfaces of the diodes have AR coating 304, there is a small amount of reflection from the output surfaces. Such AR coating is important to the generation of the light of a single frequency by the diode. Also, the reflection from the end surfaces of the lens or the optical fiber must be controlled. However, an isolator cannot be used since it nullifies the influence of the external feedback. Therefore, the reflection from the surface of the optical fiber is controlled by adding the fine lens to the end surface of the optical fiber or processing the end surface of the optical fiber to a lens type.

The pumping light generated by the pumping portion 200 is input to the MUX 220 through the splicing portion 210. The MUX 220 is a single mode optical fiber multiplexer. When the wavelength interval of the MUX 220 is 0.8 nm or 1.6 nm, since the bandwidth of the currently grating stabilized 980 nm laser diode is 0.5 nm, a pumping light having power of 50 mW or 100 mW must be adjusted to the bandwidth of 1 nm. Therefore, excitation between bands can be performed using a range of wavelengths from 1470 nm through 1490 nm in order to obtain total pumping power of 1 W or more from the 10 or more diodes. Also, it is possible to pump 980 nm light to obtain the same total pumping power from the similar number of diodes in the range of the wavelength of 20 nm. For example, it is possible for a 8×1 MUX to obtain a total pumping power of 0.5 W or more by multiplexing the pumping light output from eight pump diodes.

The pumping light multiplexed by the MUX 220 is wavelength stabilized through the broad-band reflecting portion 230. Referring to FIG. 3A, the pumping light passes through the optical couple 232 and through the loop 234. The light incident on the optical coupler 232 proceeds without a phase shift in a direction a and with a phase shift of 90° in a direction b. The loop 234, which is the polarization maintaining optical fiber, guides the light in the direction a and has a light incident on the optical coupler 232. Ten percent of the pumping light is separated from the optical coupler 232 and is reflected to the MUX 220, while the remaining 90% is incident on an optical amplifier (not shown).

FIG. 3B is another embodiment of the pumping apparatus shown in FIG. 3A and has a pumping portion 240, a splicing portion 250 and a MUX 260 which correspond to the pumping portion 200, the splicing portion 210, and the MUX 220, respectively, shown in FIG. 3A. There is a broad-band reflecting portion 270 which is different from the broad-band reflecting portion 230. The broad-band reflecting portion 270 shown in FIG. 3B includes a wavelength division multiplexing (WDM) coupler 274 connected to the MUX 260 and an optical fiber 272 connected to the WDM coupler 274, both sides of which are HR coated.

Stabilization of the pumping light is performed as follows. The pumping light multiplexed through the MUX 260 is divided into two HR coated optical fibers by the WDM coupler 274, and is reflected from the two HR coated surfaces 272. Some of the light reflected is again input to the MUX 260 through the WDM coupler 274, and the remaining light is incident on an optical amplifier (not shown).

FIG. 3C is still another embodiment of the pumping apparatus shown in FIG. 3A and has a pumping portion 280, a splicing portion 285 and a MUX 290 which correspond to the pumping portion 200, the splicing portion 210 and the MUX 220 shown in FIG. 3A. There is a broad-band reflecting portion 295 which is different from the broad-band reflecting portion 230 of FIG. 3A. The broad-band reflecting portion 295 of FIG. 3C is a fiber grating reflector. Some of the output light of the MUX 290 is again reflected to the MUX 290 by the optical fiber grating reflector 295, and the remaining light is incident on an optical amplifier (not shown).

Figure 4:
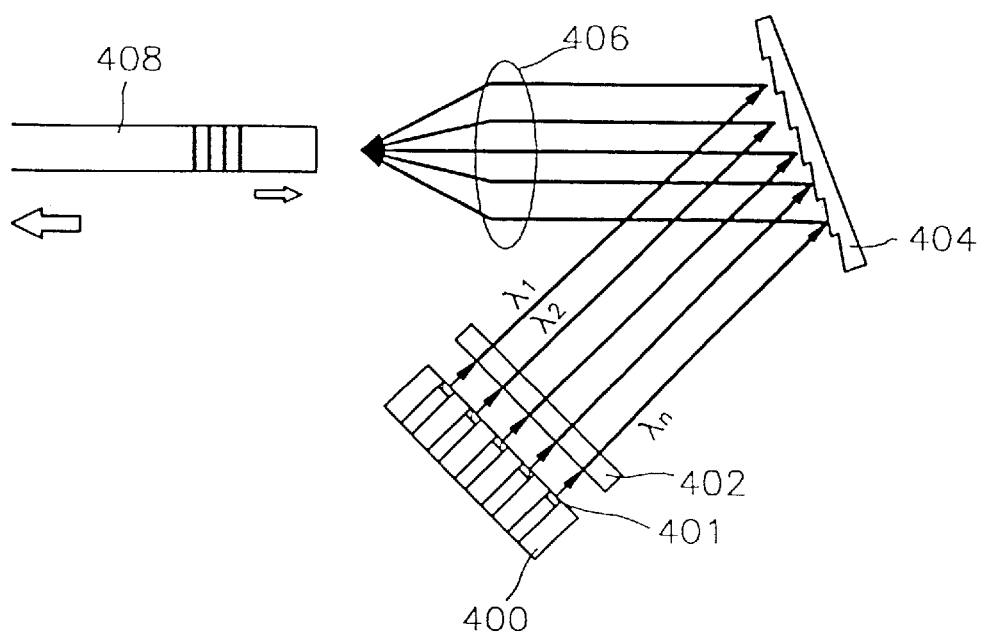
FIG. 4 shows another embodiment of a high power pumping apparatus for optical fiber amplification according to the present invention.

FIG. 4 is still another embodiment of a high power pumping apparatus for optical fiber amplification according to the present invention. The pumping apparatus according to FIG. 4 includes a pumping portion 400, a light collecting portion 402, a diffraction grating 404, a light collecting lens 406 and an optical fiber grating reflector 408.

The pumping portion 400 comprises a plurality of laser diodes, the output surfaces 401 of which are AR coated so that a small amount of reflection is performed from the output surface. The wavelength of the pumping light is determined in correspondence to the wavelength of the feedback light reflected through the diffraction grating 404.

Since the wavelengths of the respective diodes of the pumping portion 400 are selected by the light fed back through the diffraction grating 404, the diodes having the same wavelength band can be used. Since the output surface 401 of the diode is AR coated, a small amount of reflection is performed from the output surface 401. The AR coating is important in the generation of light of a single frequency by the diode.

The light collecting portion 402 collects light pumped by the pumping portion 400 and outputs light having the respective wavelengths. The light collecting portion 402 collects the light reflected from the diffraction grating 404 and outputs the light to the pumping portion 400.

The diffraction grating 404 diffracts the pumping light passing through the light collecting portion 402, outputs the light to the light collecting lens 406, and diffracts the light divided according to the respective wavelengths from the light collecting lens 406.

Figure 5:
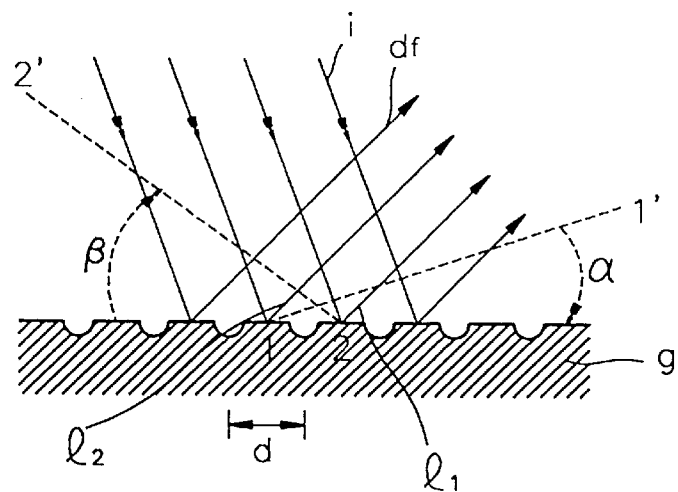
FIG. 5 shows a cross sectional view of the diffraction grating in FIG. 4.

The operation of the diffraction grating 404 will be described in more detail with reference to FIG. 5. FIG. 5 shows the cross section of a diffraction grating in order to describe the operating principle of the diffraction grating. The terms i, df, and g, respectively denote incident light, diffracted light; and a diffraction grating. d, 1-1', and 2-2' denote the period of grating, the wave surface of the incident light, and the wave surface of the diffracted light, respectively. The condition that the light having the wavelength $\lambda$ is diffracted in a direction different from that of the incident direction when light path differences between beams $1_1$ and $1_2$ reflected from two reflecting points are integer multiples is determined as follows:

$$d(\sin \beta - \sin \alpha) = m\lambda (m=1,2, \ldots) \qquad \text{[EQUATION 1]}$$

wherein $\alpha$ is an incident angle with respect to a diffraction grating surface and $\beta$ is a diffraction angle.

The amount of change of the diffraction angle according to the wavelength of the incident light, (i.e., the value $d\beta/d\lambda$) of the diffraction grating corresponding to the angle dispersions of a prism is determined as follows.

$$\frac{d\beta}{d\lambda} = \frac{m}{d\cos\beta} \qquad \text{[EQUATION 2]}$$

Figure 6:
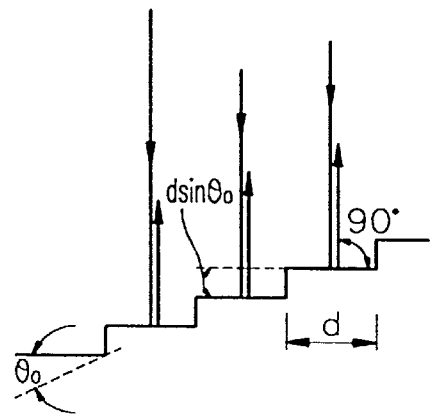
FIG. 6 shows an example of the diffraction grating in FIG. 4.

To make $d\beta/d\lambda$ large, it is effective to get a period d of grating reduced and the degree m enlarged. Actually, the Echellette grating having a sawtooth-shaped section shown in FIG. 6 is preferred. When parallel light is incident on the grating, the intensity of the diffraction light is determined by multiplying the reflection effect of a single groove plane with the diffraction effect of the single groove plane. The reflection is not performed with respect to the wavelength but is performed so that the light has a maximum intensity in a direction that satisfies the reflection condition from the tilted surface of the groove. The diffraction is performed so that the light has the maximum intensity in a direction which satisfies the diffraction condition. Therefore, it is possible to collect almost 100% of the diffraction light in specific degree and wavelength. For example, when the incident light is vertically incident on the tilted surface of the groove using the diffraction light of the first degree, the diffraction light vertically returns. The wavelength is called a Bragg's wavelength $\lambda_B$ and is determined as follows:

$$\lambda_B = 2d \sin \theta_0 \qquad \text{[EQUATION 3]}$$

wherein d represents a period of grating.

The light collecting lens 406 collects the pumping light diffracted by the diffraction grating 404, has the pumping light incident on the optical fiber grating reflector 408, and divides the light reflected from the optical fiber grating reflector 408 according to the respective wavelengths.

The optical fiber grating reflector 408 transmits about 80% of the incident pumping light and reflects the remaining 20%. The reflected light is incident on the diffraction grating 404 through the light collecting lens 406. The laser diodes of the pumping portion 400 determine the wavelength of the pumping light by the light fed back from the diffraction grating 404.

In the high power pumping apparatus according to the present invention, the same pumping diodes can be used without a wavelength selecting diode.

High power pumping is useful in optical fiber amplification for a cable TV, a remote pump, a high power analog booster EDFA, and a Raman amplifier since pumping is performed in a wide spectrum range.

Also, the high power pumping apparatus can be used at any wavelength including 980 nm and 1480 nm. It does not matter critically as though one of pumping laser diodes is damaged.

In the high power pumping apparatus, it is possible to perform the highest power pumping by use of the pumping diode and to automatically control the wavelength and the polarization.

What is claimed is:

1. A high power pumping apparatus for optical fiber amplification, said apparatus comprising:

a pumping portion for generating pumping light of a predetermined wavelength band having a wavelength which is determined by a wavelength of pumping light fed back to said pumping portion;

a wavelength division multiplexer for multiplexing the pumping light generated by the pumping portion to produce output light, for dividing signal light incident thereon according to wavelength, and for outputting the signal light to the pumping portion; and a broad-band reflecting portion for reflecting a portion of the output light from the wavelength division multiplexer, for outputting the reflected portion to the wavelength division multiplexer as the signal light incident thereon, and for outputting a remaining portion as pumping light for light amplification.

2. The apparatus of claim 1, wherein the pumping portion comprises a plurality of laser diodes, each having the same wavelength band.

3. The apparatus of claim 2, wherein the plurality of laser diodes have output surfaces which are anti-reflection coated.

4. The apparatus of claim 1, wherein the broad-band reflecting portion comprises:

an optical coupler connected to the wavelength division multiplexer for separating incident light at a ratio of 90:10; and an optical loop for guiding light so as to travel in a single direction as guided light, and for outputting the guided light onto the optical coupler.

5. The apparatus of claim 4, wherein the optical loop is a polarization maintaining optical fiber.

6. The apparatus of claim 1, wherein the broad-band reflecting portion comprises:

an optical fiber having ends which are high reflection coated; and an optical coupler connected to the optical fiber for reflecting some of the light reflected from the ends of the optical fiber, for transferring the reflected light to the wavelength division multiplexer, and for outputting remaining light as the pumping light for light amplification.

7. The apparatus of claim 1, wherein the broad-band reflecting portion is an optical fiber grating reflector for reflecting a portion of incident light, for transferring the reflected portion to the wavelength division multiplexer, and for transmitting remaining incident light for light amplification.

8. A high power pumping apparatus for optical fiber amplification, said apparatus comprising:

a pumping portion for generating pumping light of a predetermined wavelength band having a wavelength which is determined by a wavelength of the pumping light fed back to said pumping portion;

a diffraction grating for diffracting the pumping light generated by the pumping portion with respect to predetermined wavelengths, for inversely diffracting light incident thereon, and for outputting light to the pumping portion;

a light collecting lens for collecting the light diffracted by the diffraction grating, for dividing incident light reflected from a subsequent portion according to wavelengths, and for outputting the light to the diffraction grating; and an optical fiber grating reflector for reflecting a portion of the light collected by the light collecting lens, for outputting the reflected portion to the light collecting lens, and for outputting remaining light as the pumping light for light amplification.

9. The apparatus of claim 8, further comprising a light collecting portion positioned between the pumping portion and the diffraction grating and including means for collecting the pumped light according to the predetermined wavelengths, means for outputting the collected light to the diffraction grating, means for collecting the light inversely diffracted by the diffraction grating according to the wavelengths, and means for outputting the inversely diffracted light to the pumping portion.

10. The apparatus of claim 8, wherein the pumping portion comprises a plurality of laser diodes having output surfaces which are anti-reflection coated.

11. The apparatus of claim 10, wherein the plurality of laser diodes comprises a plurality of laser diodes having a common output wavelength range.

12. The apparatus of claim 8, wherein the diffraction grating is an Echelette grating.

13. A high power pumping apparatus for optical fiber amplification, said apparatus comprising:

pumping means for generating pumping light having a predetermined wavelength band;

wavelength division multiplexer means for multiplexing the pumping light generated by the pumping means and producing a multiplexer output; and broad-band reflecting means for reflecting a portion of the multiplexer output and for outputting the reflected portion of the multiplexer output, said broad-band reflecting means outputting a remaining portion as feedback pumping light;

wherein said pumping means determines a wavelength of said pumping light in accordance with a wavelength of said feedback pumping light from said broad-band reflecting means.

14. The apparatus of claim 13, wherein said pumping means comprises a plurality of laser diodes.

15. The apparatus of claim 14, wherein said plurality of laser diodes have output surfaces which are anti-reflection coated.

16. The apparatus of claim 13, wherein said broad-band reflecting means comprises an optical coupler connected to said wavelength division multiplexer means for separating incident light at a given ratio, and an optical loop for guiding light so that said light travels in a single direction, said optical loop outputting the guided light to said optical coupler.

17. The apparatus of claim 16, wherein said optical loop comprises a polarization maintaining optical fiber.

18. The apparatus of claim 13, wherein said broad-band reflecting means comprises an optical fiber having ends which are high reflection coated, and an optical coupler connected to said optical fiber for reflecting a portion of light reflected from the ends of said optical fiber, and for producing said feedback pumping light.

19. The apparatus of claim 13, wherein said broad-band reflecting means comprises an optical fiber grating reflector for reflecting a portion of incident light, for transferring the reflected portion as said feedback pumping light, and for transmitting remaining incident light.

20. A high power pumping apparatus for optical fiber amplification, said apparatus comprising:

pumping means for generating pumping light in accordance with a predetermined wavelength band;

diffraction grating means for diffracting the pumping light generated by said pumping means, and for outputting light to said pumping means;

light collecting lens means for collecting the light diffracted by said diffraction grating means, and for outputting the light to said diffraction grating means; and optical fiber grating reflector means for reflecting a portion of the light collected by said light collecting lens means, and for outputting the reflected portion to said light collecting lens means and a remaining portion as pumping light for light amplification.

21. The apparatus of claim 20, further comprising light collecting portion means positioned between said pumping means and said diffraction grating means for collecting the pumped light, for outputting the collected pumped light to the diffraction grating means, for collecting light inversely diffracted by said diffraction grating means, and for outputting the inversely diffracted light to said pumping means.

22. The apparatus of claim 20, wherein said pumping means comprises a plurality of laser diodes having output surfaces which are anti-reflection coated.

23. The apparatus of claim 22, wherein said plurality of laser diodes have a common output wavelength range.

24. The apparatus of claim 20, wherein said diffraction grating means comprises an Echelette grating.

* * * * *